April 9, 1963 S. S. MITCHELL 3,084,677
SLIDING VANE TYPE ROTARY STEAM ENGINE
Filed Feb. 20, 1961 3 Sheets-Sheet 1

SAMUEL S. MITCHELL
*INVENTOR.*

April 9, 1963 S. S. MITCHELL 3,084,677
SLIDING VANE TYPE ROTARY STEAM ENGINE
Filed Feb. 20, 1961 3 Sheets-Sheet 2

SAMUEL S. MITCHELL
*INVENTOR.*

BY *James D. Girman*
ATT'Y

April 9, 1963 S. S. MITCHELL 3,084,677
SLIDING VANE TYPE ROTARY STEAM ENGINE
Filed Feb. 20, 1961 3 Sheets-Sheet 3
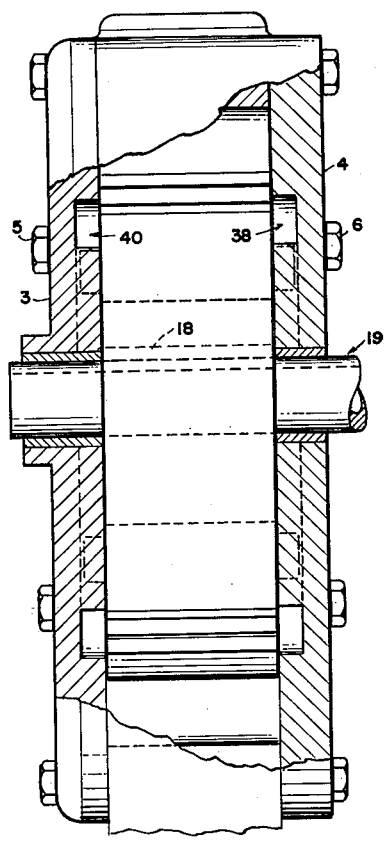
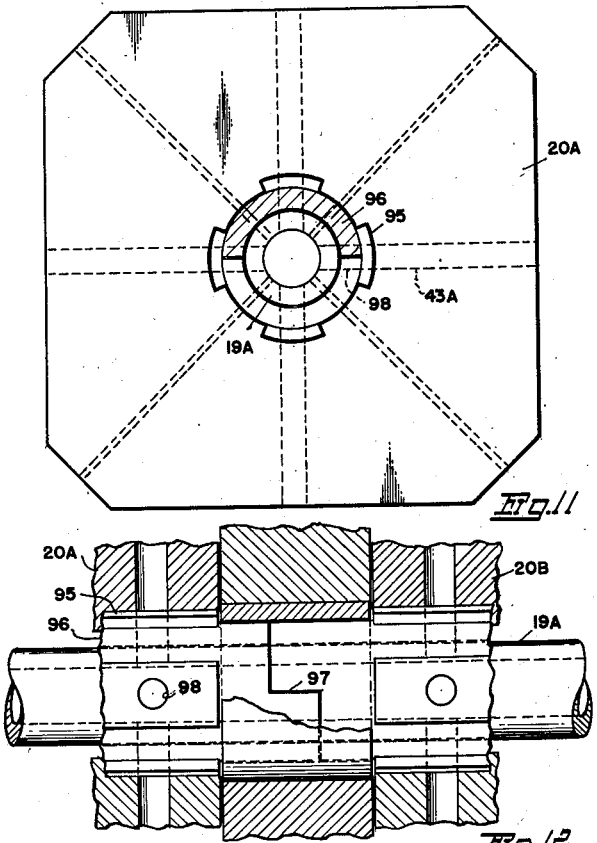
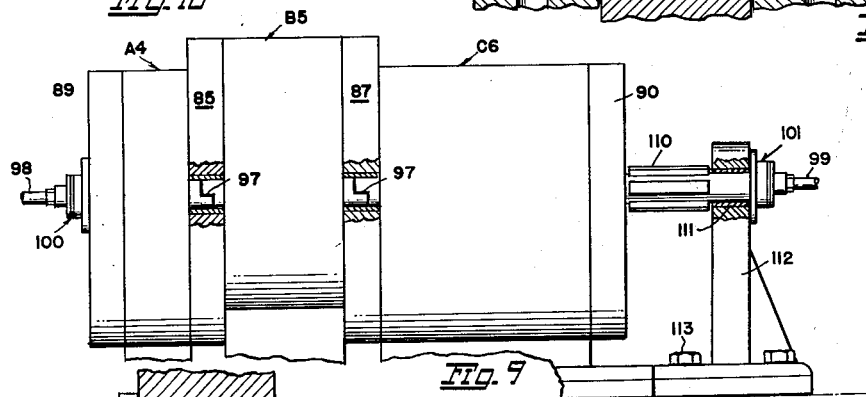
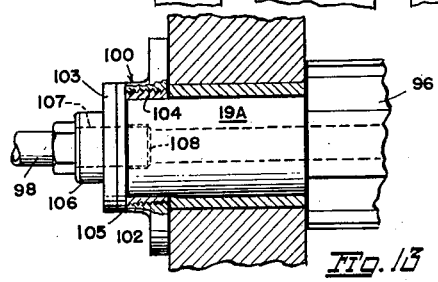
SAMUEL S. MITCHELL
INVENTOR.
BY James D. Girman
ATT'Y

United States Patent Office 3,084,677  
Patented Apr. 9, 1963

3,084,677  
SLIDING VANE TYPE ROTARY STEAM ENGINE  
Samuel S. Mitchell, 3626 SE. 62nd Ave., Portland, Oreg.  
Filed Feb. 20, 1961, Ser. No. 90,323  
2 Claims. (Cl. 121—85)

This invention relates to improvements in steam engines of the rotary type.

One of the principal objects of the invention is to provide a rotary engine of the character described which is operable by expansive fluid and adapted to isolate charges of such fluid between inlet and outlet ports and to use the expansive forces of such isolated fluid to drive the rotor of such engine.

Another object is the provision of means to prevent any application to the rotor of back pressure from the expansive fluid.

Another object is the provision of an engine of this character which may be built in multiple units wherein each unit is adapted for use as a unitary engine or when all of the units are assembled to operate as a multiple expansion steam engine.

An important feature of the invention resides in the combination with a stator in the form of a cylinder having a circular wall for the major circumference of its inner periphery, an inlet arranged tangential to said circular wall and a lateral outlet; of a rotor provided with cam-actuated vanes each so mounted as to adapt itself to a highly efficient fluid-tight working fit to the cylinder wall as well as to the side walls thereof.

Another object is to provide a rotary steam engine which is designed particularly to attain a high degree of smoothness in operation and involving a form of construction rendering it easily assembled and relatively simple in operation. The form of construction furthermore is such as to attain a high degree of durability and is of a form that may be manufactured at a lower cost than that of similar devices heretofore manufactured.

A further object is to provide an engine in which all moving parts have a rotary motion by means of which a uniformly changing amount of work is done with no unbalanced stresses, and with freedom of vibration and with a minimum of friction.

It is also an object to construct a rotary engine so that valves and undesirable springs are eliminated while at the same time the vanes employed are constantly held seated under uniform pressure without use of centrifugal force.

A further and important object is the provision of a device of the general character described which may be combined with other similar devices in a single balanced unit, mounted on the same shaft if desired, and by the arrangement of vanes, angles of eccentricity, ports, etc., a multi-stage expansion of fluids is attained.

The foregoing and other objects and advantages which will become subsequently apparent reside in the details of construction and operation as more fully hereinafter described and claimed, reference being had to the accompanying drawings forming a part hereof and in which:

FIGURE 9 is a view similar to FIGURE 8 showing a further modification.

FIGURE 10 is a side elevational view of FIGURE 5 with an end bell applied and with fragments broken away and parts in section for clearness of illustration.

FIGURE 11 is a sectional detail view on an enlarged scale of a typical rotor hub.

FIGURE 12 is a sectional view through two of the hubs and a divider.

FIGURE 13 is a sectional detail view on an enlarged scale of a typical end bearing and means for delivering lubricant to a hollow shaft journalled in the bearing.

Figure 1:
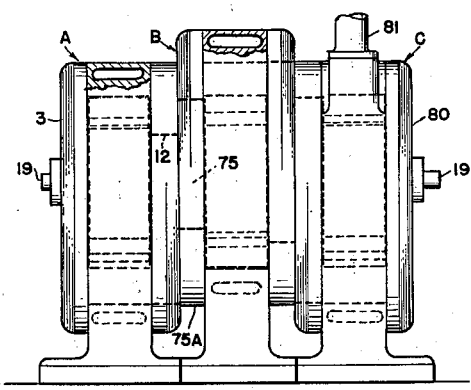
FIGURE 1 is a side elevational assembly view of a compound rotary steam engine made in accordance with my invention, with fragments broken away for convenience of illustration, and made up of the three units shown in end elevation in FIGURES 2, 3 and 4.
Figure 2:
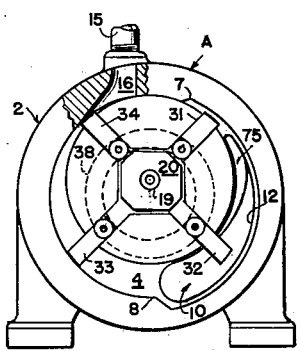
Figure 3:
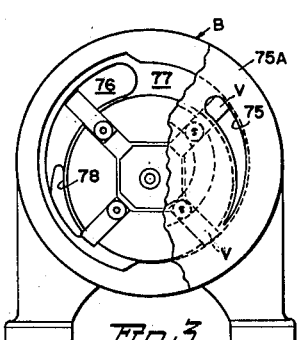
Figure 4:
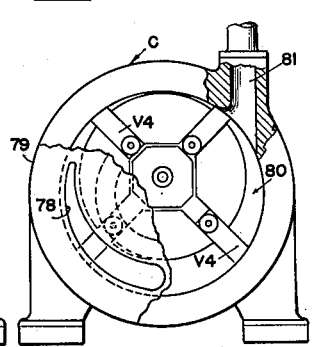
Figure 5:
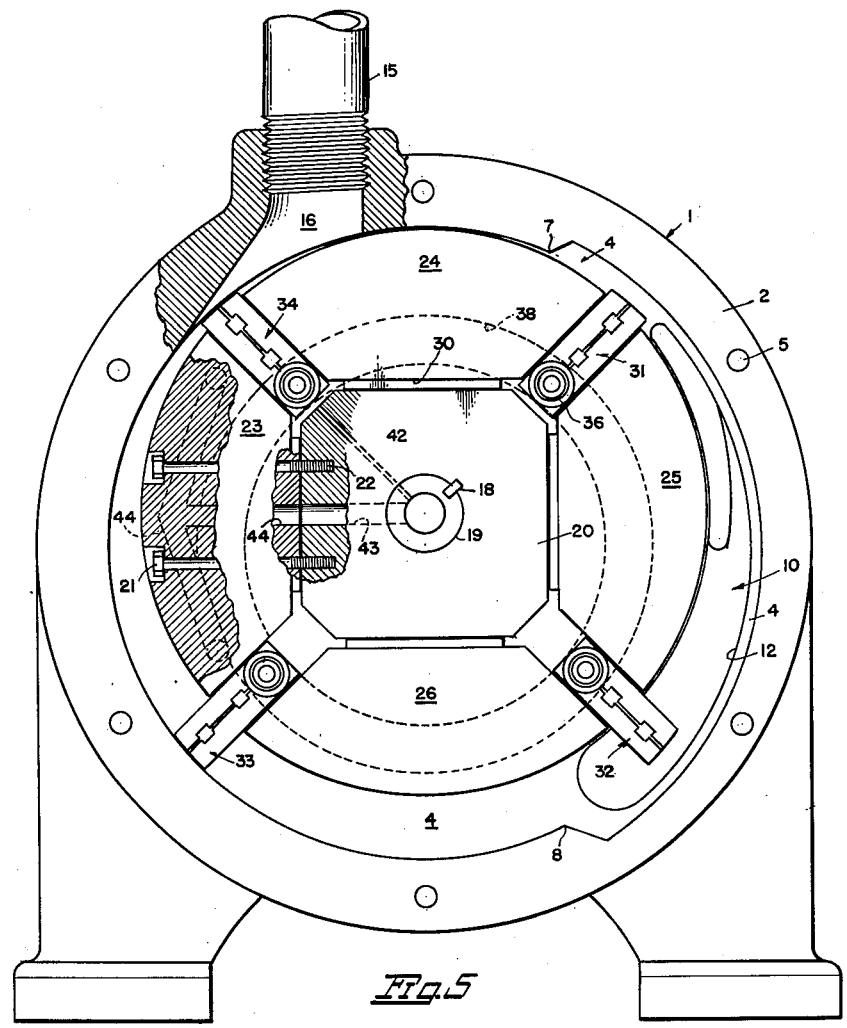
FIGURE 5 is a repetition of FIGURE 2 on an enlarged scale and with fragments broken away to reveal certain internal parts.

With continuing reference to the drawings wherein like reference characters designate like parts and particularly FIGURE 1 thereof, reference characters A, B and C indicate generally the three power units shown in FIGURES 2, 3 and 4 assembled and operatively interconnected into a unitary three cylinder engine. Each of units A, B and C is adaptable for operation as an individual power plant as will be readily understood as the disclosure in FIGURES 5 and 10 are more fully hereinafter described.

The unit A comprises a stator in the form of a hollow cylinder 2 supported upon suitable leg members as shown and closed at both of its ends by end bells 3 and 4, secured to the cylinder by suitable bolts and nuts 5 and 6. The wall of the cylinder is of uniform thickness for approximately 230 degrees of its inner periphery then gradually reduced in wall thickness from a point indicated at 7 to a point 8 to provide an exhaust area 10 progressively reducing in cross-sectional area as shown. The end bell 4 is provided with an exhaust port 12 in open communication with the exhaust area 10. Live steam from a source not shown, is delivered from a pipe 15 through an intake port 16 to the interior of the cylinder 2.

Secured as at 18 to a hollow shaft 19 and eccentrically disposed relative to the interior of cylinder 2 is a four-sided rotor hub 20. Permanently secured as at 21 and 22 to the hub 20 are rotor segments 23, 24, 25 and 26 spaced apart circumferentially as shown and undercut along both of their inner edges as at 30. Vanes indicated generally at 31, 32, 33 and 34 are slidably mounted within the spaces between the segments for radial outward and inward movement relative thereto, such movement being imparted to the vanes by means of their rollers 36 and 37 operating respectively within an annular groove 38 concentrically formed on the inner face of the end bell 4 and a matching groove 40 formed on the inner face of the end bell 3. The vanes 31–34 are supplied with a lubricant, also serving as a cooling medium, from a source not shown, through the hollow shaft 19 and oil ducts 42. Each of the rotor segments 23–26 is supplied with the same lubricant by means of ducts 43 leading from the interior of the hollow shaft 19 and communicating with suitably bored passageways 44 extending outwardly lengthwise and across each rotor segment.

Figures 6, 7:
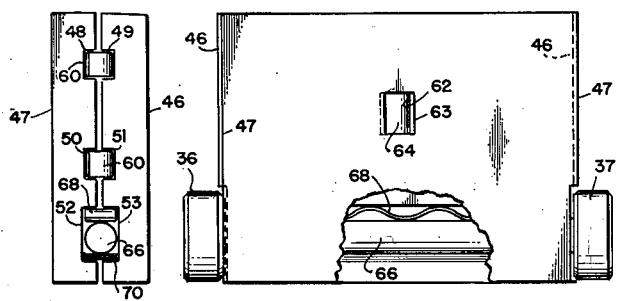
FIGURE 6 is an elevational detail view of a typical vane.
FIGURE 7 is an end elevational view of FIGURE 6 with one of the rollers removed.

Each vane as best illustrated in FIGURES 6 and 7 is made in two sections 46 and 47 having formed therein opposing channels 48—49, 50—51 and 52—53. Disposed within the first two pairs of channels mentioned are leaf springs 60 bent into successive curves in opposite directions for exerting lateral spreading forces against the vane halves to thereby provide a proper and leakproof working fit within the vane-space between the rotor segments.

The vane sections are provided with transverse openings 62 and 63 cooperating to provide a housing for a similar leaf spring 64 normally urging the vane sections in lateral offset relationship to each other as shown in FIGURE 6 to thereby provide an effective seal between the side edges of the vanes and their respective end bells. The shaft 66 for the rollers 36 and 37 is disposed within the opposing channels 52 and 53 within which is also disposed a leaf spring 68 reacting against the shaft 66 to normally maintain the top or outer edge of the vane sections in properly sealed working contact with the inner wall of the cylinder 2 from the intake port 16 around to the point 8 of the exhaust area 10.

Shims 70 may also be inserted within the channels 52—53 between the bottom thereof and the bottom of the roller shaft 66 to regulate the amount of compression applied to the spring 68.

From the foregoing it will be apparent that steam from the supply line 15 entering the interior of the cylinder 2 will act upon the vanes 34 and 33 to put the rotor into counter clockwise rotation as viewed in FIGURE 5 until each vane so acted upon passes the point 8 at the origin of the exhaust area 10. The steam can then exhaust through the port 12 when unit A for example is used as a single power plant or exhaust into unit B and then into C when the three units are assembled into a compound engine as shown in FIGURE 1. As previously stated the vanes will be held in effective working contact with the inner wall of the cylinder by the cam-follower function of the vane rollers 36 and 37 within their respective grooves 38 and 40 and similarly out of contact with the wall of the cylinder throughout the length of the exhaust area 10.

To prevent "air-cushioning" between the inner ends of the vanes and the rotor hub 20 I provide the undercut 30, above referred to, in each segment to allow escapement or transfer of air from the diminishing area between the hub and the inwardly moving vanes to the increasing area between the outwardly moving vanes and the hub.

In the assembly shown in FIGURE 1 steam from unit A (FIG. 2) passes through exhaust area 10 into intake 75 of end bell 75A of unit B (FIG. 3) wherein the vanes V thereof are acted upon in further rotation of shaft 19, journalled in end bells 3 and 80 and to which the hubs of all three units are secured. Steam exhausts from unit B through exhaust area 76 in end bell 77 thereof through intake 78 in end bell 79 of unit C (FIG. 4) and drives vanes V4 counter-clockwise until it finally exhausts through outlet 81.

Figure 8:
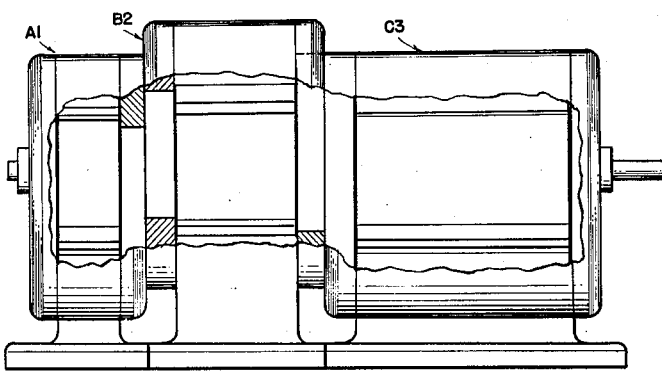
FIGURE 8 is a view similar to FIGURE 1 of a modification showing the invention embodied in a triple expansion type of rotary engine.

In the compound assembly illustrated in FIGURE 8 the rotor hubs, rotor segments, vanes and related parts in units A1, B2 and C3 are the same as those shown in units A, B and C of FIGURES 2, 3 and 4, except that the parts just mentioned in units B2 and C3 are of relatively greater width than those shown in units B and C to thereby effect a triple expansion feature.

In the further modification illustrated in FIGURE 9 the rotor hubs, rotor segments and vanes are identical with those shown and described in connection with the modification shown in FIGURE 8, except that a divider 85 seals the inner face of cylinder A4 and the adjacent face of cylinder B5 whose opposite face is sealed by divider 87 which also seals the adjacent end of cylinder C6. The outside faces of cylinders A4 and C6 are sealed by end bells or members 89 and 90 similar to the dividers 85 and 87.

In the three embodiments of the invention herein shown and described the central units B, B2 and B5 of FIGURES 1, 8 and 9 respectively are inverted relative to their end units A, C—A1, C3 and A4, C6 respectively.

In FIGURE 9 and as best illustrated in FIGURES 11 and 12, the rotor hubs 20A of the three units A4, B5 and C6 are splined as at 95 to individual spline shafts 96 whose adjacent ends are machined for coupled engagement as at 97. The spline shafts are pinned or otherwise suitably secured to the hollow engine shaft 19A to impart rotation thereto and to maintain openings 98 in the spline shafts in communication with the oil ducts 43A in the rotor hubs 20A. Oil from a source (not shown) is delivered to the interior of the hollow shaft 19A through an inlet tube 98, circulated through the engine and discharged therefrom through an outlet tube 99.

Identical fittings 100 and 101 for the inlet and outlet tubes are provided at the ends of the shaft 19A and each comprises an internally threaded housing 102, a cap 103 having an externally threaded tubular portion 104 secured within the housing and sealed by a gasket 105. The cap is provided with an internally threaded hub 106 into which is threaded a fitting 107 in open communication at its inner end, as at 108, with the interior of the hollow shaft 19A and attached at its outer end to the inlet or outlet tube 98 or 99.

As shown in FIGURE 9 one end of the shaft 19A extends beyond the end bell 90, is splined as at 110 for the attachment of a driven pulley (not shown) and is journalled at its outer end, as at 111, in the top end of a standard 112 secured as at 113 to a base or other support for the engine in its entirety.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

1. In a rotary steam engine having a cylindrical housing closed at both of its ends, provided on its interior with a working area and an exhaust area and a steam inlet and exhaust outlet in communication respectively with said intake and exhaust areas; the improvement comprising an engine shaft rotatably mounted in the housing, a four-sided hub secured to said engine shaft, a rotor comprising circumferentially spaced apart segments secured to said hub, radially slidable vanes disposed within the spaces between said segments, each of said vanes comprising two sections, resilient means interposed between said vane sections urging the same laterally in opposite directions against adjacent ends of said rotor segments and into contact with the closed ends of said cylindrical housing, said closed ends of the housing having opposing cam grooves concentric with the interior of said housing, cam follower means carried by said vanes and operable in said cam grooves, whereby live steam entering said working area and acting on said vanes will put the rotor and engine shaft into rotation and whereby steam from said working area will exhaust from said exhaust area out through said outlet during passage of said vanes through the exhaust area, the inner edges of said rotor segments being undercut to allow transfer of air from the diminishing area between the hub and the vanes when the vanes are moving inwardly to the increasing area between the hub and outwardly moving vanes.

2. In a rotary steam engine having a cylindrical housing closed at both of its ends, provided on its interior with a working area and an exhaust area and a steam inlet and exhaust outlet in communication respectively with said intake and exhaust areas; the improvement comprising a hollow engine shaft rotatably mounted in the housing and adapted for connection to a source of lubricant, a four-sided hub secured to said engine shaft, a rotor comprising circumferentially spaced apart segments secured to said hub, said segments having outwardly, transverse, and longitudinal bored passageways therein, radially slidable vanes disposed within the spaces between said segments, each of said vanes comprising two sections, resilient means interposed between said vane sections urging the same laterally in opposite directions against adjacent ends of said rotor segments and into contact with the closed ends of said cylindrical housing, said closed ends of the housing having opposing cam grooves concentric with the interior of said housing, cam follower means carried by said vanes and operable in said cam grooves, whereby live steam entering said working area and acting on said vanes will put the rotor and engine shaft into rotation and whereby steam from said working area will exhaust from said exhaust area out through said outlet during passage of said vanes through the exhaust area, the inner edges of said rotor segments being undercut to allow transfer of air from the diminishing area between the hub and the vanes when the vanes are moving inwardly to the increasing area between the hub and outwardly moving vanes, said hub having a first series of ducts in communication with the interior of said hollow shaft and directed to the inner ends of said vanes, said hub having a second series of ducts in open communication with the interior of said hollow shaft and with said passageways in said rotor segments.

References Cited in the file of this patent

UNITED STATES PATENTS

| | | |
|---|---|---|
| 711,952 | Dunn | Oct. 28, 1902 |
| 802,843 | Cornelison et al. | Oct. 24, 1905 |
| 838,631 | Loeffler | Dec. 18, 1906 |
| 870,290 | Henkel | Nov. 5, 1907 |
| 929,575 | Freese | July 27, 1909 |
| 978,743 | Haudenshield | Dec. 13, 1910 |
| 1,023,782 | Hummel | Apr. 16, 1912 |
| 1,026,165 | Hummel | May 14, 1912 |
| 1,067,037 | Kleineick | July 8, 1913 |
| 2,208,177 | Barrett | July 17, 1940 |